United States Patent [19]

Melan et al.

[11] 4,433,991

[45] * Feb. 28, 1984

[54] APPARATUS FOR THE MANUFACTURING OF FIBERS

[75] Inventors: Giuseppe Melan, Besana Brianza, Italy; Pierre Verdet, Aix les Bains; Christian Besenval, Montmelian, both of France

[73] Assignee: Société Vetrotex Saint-Gobain, Chambéry, France

[*] Notice: The portion of the term of this patent subsequent to May 4, 1999 has been disclaimed.

[21] Appl. No.: 338,582

[22] Filed: Jan. 8, 1982

Related U.S. Application Data

[62] Division of Ser. No. 207,711, Nov. 17, 1980, Pat. No. 4,328,015.

Foreign Application Priority Data

Nov. 20, 1979 [FR] France ................................. 79 28539

[51] Int. Cl.³ .......................................... C03B 37/025
[52] U.S. Cl. ................................................ 65/1; 65/2; 65/12
[58] Field of Search .................................. 65/1, 2, 12

[56] References Cited

U.S. PATENT DOCUMENTS

| | | | |
|---|---|---|---|
| 2,407,456 | 9/1946 | Simison et al. | |
| 3,334,981 | 8/1967 | Glaser | 65/12 |
| 3,522,025 | 7/1970 | Smith | 65/12 |
| 3,695,858 | 10/1972 | Russell | 65/2 |
| 3,829,301 | 8/1974 | Russell | 65/2 |
| 3,905,790 | 9/1975 | Strickland | 65/2 |
| 4,088,467 | 5/1978 | Shono et al. | 65/2 |
| 4,197,103 | 4/1980 | Ishikawa et al. | 65/1 |
| 4,222,757 | 9/1980 | Glaser et al. | 65/2 |
| 4,328,015 | 5/1982 | Melan et al. | 65/2 |
| 4,351,656 | 9/1982 | Jensen | 65/1 |

FOREIGN PATENT DOCUMENTS

| | | |
|---|---|---|
| 2014197 | 4/1970 | France . |
| 2286799 | 4/1976 | France . |
| 2297194 | 8/1976 | France . |
| 763160 | 12/1956 | United Kingdom . |

*Primary Examiner*—Robert L. Lindsay, Jr.
*Attorney, Agent, or Firm*—John T. Synnestvedt; Charles H. Lindrooth

[57] ABSTRACT

A process and apparatus for forming fibers from attenuable materials, such as molten glass, by attenuating streams of glass from the bottom of a bushing wherein the bottom has downwardly presented wall portions at upper and lower levels. According to the disclosure the upper and lower wall portions are formed into series of elongated channels, separated by grooves in the underside of the bushing. Filamentary material is manufactured by drawing at least one filament from each of a plurality of orifices formed in spaced rows in the bottom walls of the channels. Temperature differences existing in the molten material within the bushing are evened out by differential cooling of the material as it flows through the channels to the orifices. Cooling is effected in various ways including the placement of solid elongated cooling fins underneath the grooves between channels.

13 Claims, 12 Drawing Figures

APPARATUS FOR THE MANUFACTURING OF FIBERS

This application is a divisional of copending application Ser. No. 207,711 filed Nov. 17, 1980 now U.S. Pat. No. 4,328,015 granted May 4, 1982.

FIELD OF THE INVENTION

The present invention relates to a process and an apparatus for the manufacture of fibers from thermoplastic materials, especially mineral materials such as glass, by attenuating the material in attenuable form at the exit of orifices in the bottom of a bushing and in particular to the use of a bushing having a high density of orifices. In particular, it concerns the manufacture of continuous glass fibers by the mechanical attenuation of streams and filaments drawn from the orifices, these filaments being gathered into strands which are generally wound onto a support.

BACKGROUND AND THE PRIOR ART

The most commonly used procedure for manufacturing a continuous fiber product such as strand consists of drawing streams of molten material from a bushing of which the base plate is equipped with orificed tips. When cooling means are associated with the tips, stable separation of the streams is enhanced. The tips tend to minimize the phenomenon of "flooding" of the bushing base, particularly at the time of a filament rupture during the fiberization operation. This flooding is manifested by the tendency of the molten material issuing from an orifice to spread over the surrounding undersurface of the base plate, because of capillary action and the wetting effects of the plate. At the moment of filament rupture during the fiberization operation, the presence of tips tends to reduce the massive flooding of the base plate which would otherwise occur.

Taking into account the difficulties in manufacturing a bushing base with tips and also the significant space occupied by the tips, various efforts have been made to eliminate them and to replace the tipped bushing base with a generally flat perforated plate having a large number of orifices within a given surface area. The result of these efforts is the simultaneous attenuation of a larger number of filaments per bushing and consequently the possibility of the manufacture of new products, and a reduction in deformation problems of the bushing base which become progressively more significant as bushing surface area becomes larger.

Nevertheless, the advantage of an increase in the number of orifices per surface unit of the plate is, in practice, rapidly reduced by the flooding problem which occurs at the time of a filament rupture and which is produced much more easily since the distances between adjacent orifices are smaller, and the fiberization conditions, particularly the temperatures adjacent to the orifices of the plate, are less stable or less uniform.

Various different apparatus and processes have been proposed in order to obtain good fiberization stability with these orificed plates, to decrease the number of filament ruptures and the risks of partial or total flooding of the plate, since flooding generally leads to fairly lengthy delays in order to restart the fiberization operation. Various patents, and particularly U.S. Pat. No. 3,905,790, describe a process consisting of blowing a large volume of gas at a relatively high speed, upward, onto a housing base made of a flat plate of orifices, for the purpose of rapidly cooling the glass cones so as to prevent the flooding, and to eliminate the gases which stagnate on the lower side of the plate and create the hot spots which cause the flooding. In French Patent No. 2,297,194, the air current blown in the direction of the orifices of the plate is regulated so that the temperature of the latter is at least 23° C. lower than the temperature of the molten glass adjacent to the said plate.

This process, the basis of which is the continuous blowing of air toward the orifices of a flat plate during the normal operation of the bushing, presents certain disadvantages despite the numerous improvements it had brought, disadvantages which are inherent to the blowing itself. In particular, it is difficult to obtain relatively uniform temperatures on the group of orifices and a constant cooling of the glass cones, but these temperature variations on the base of the bushing cause a fiberization instability which unfavorably affects the manufacturing yield. In the event of flooding of the flat plate after filament rupture, the fiberization restarting operations, in general, remain long and complicated procedures. In effect, it is necessary after complete flooding of the bottom of the bushing to increase the gaseous flow to obtain solidification of the glass, to thereafter proceed with alternate reductions and increases in the gaseous flow to gradually reduce flooding. All these operations readily result in thermal imbalance of the bushing, harmful to its proper operation. It should also be noted that this process is all the more difficult to implement when small diameter fibers are desired for manufacture. Furthermore, the fiberization apparatus is fairly complicated due to the presence of the equipment for the supply of gas and of the system for regulating the various parameters relative to the gas blowing.

In an effort to decrease the tendency to flood the bushing, French Patent No. 2,128,312 describes a process according to which a special gaseous mixture is directed toward a bushing base, whether it is made of a flat plate with orifices or as a plate having parallel, longitudinal channels perforated with a row of orifices. This process consists of continuously emitting an inert or nonoxydizing gas and a hydrocarbon gas, which is decomposed by heat in order to deposit carbon and cause an adsorption of hydrogen on the bushing base. The carbon deposit, which results from the chemical decomposition of the gases in contact with the hot glass and hot bushing base, is supposed to decrease the wetting of the base by the glass, and tends to counteract the joining of the glass cones which are formed at each orifice.

However, this process presents certain disadvantages already mentioned above with regard to the blowing of gas toward the bushing base. In effect, it is difficult to obtain a satisfactory uniformity of the temperatures at the bushing base level and, consequently, the operation is again unstable, specifically for the manufacture of small diameter filaments during which the number of filament ruptures is relatively significant. The complexity of the corresponding apparatus, which comprises perforated or porous tubular parts for the distribution of the gases and an entire supply source system for the inert and the hydrocarbon gases, as well as the character of the gases utilized, prohibitively increase the cost of the fiberization installations.

A process for manufacturing fibers from a flat bushing base perforated with orifices placed in rows between which the cooling fins are situated is disclosed in French Patent No. 2,014,197, this bushing base being made of special alloys in order to prevent the wetting by the glass. Because of the flat configuration of the bushing base, any temperature differential, whether coming from the glass, the heating conditions or the thermal insulation of the bushing, is reflected at the level of the orifices, with the result that the fiberization operation is very sensitive to these differences and consequently unstable. Furthermore, the proximity of the cooling fins to the bushing base also results in base temperature variations which are detrimental to the proper operation of the process. In the event of partial flooding, the spread of molten glass over the entire bushing base seems unavoidable.

French Patent No. 1,116,519 discloses the manufacture of glass fibers with an apparatus comprising a bushing and a feeding source of molten glass combined with a rotor equipped with a stop valve. This rotor acts as a regulating pump, to adjust the output rate of glass in the bushing and its pressure on the base, and also serves to homogenize the glass. The diameter of the filaments is modified by varying the speed of the rotor and its vertical position. The bushing base has the general shape of a "V" or of a series of parallel V-shaped elements, at the summit of each of which a row of orifices is provided. This particular design and the placing of the glass under pressure is proposed for the purpose of preventing the flooding. Small cooling fins are present on both sides of the summits of the v-shaped elements.

However, it should be noted that the practical embodiment of this apparatus and its implementation on an industrial scale presents numerous difficulties, especially because of the need to utilize a rotor in the bath of molten glass in order to regulate the glass flow in an effort to inhibit the flooding.

In the following description, the expression "number of orifices per surface unit" or "density of orifices" will be used to designate the relation between the number of orifices distributed in the plate forming the bushing base and the surface occupied by this plate in an average horizontal surface, a surface which is smaller than its surface developed in the apparatus according to the invention.

OBJECTS AND ADVANTAGES OF THE INVENTION

The principal object of the present invention is the provision of a process and an apparatus which enable, with a tipless plate having a large orifice density, the achievement of good fiberization stability even for the manufacture of filaments with small diameters, for example, on the order of 5 to 7 microns, and the avoidance of the disadvantages encountered in the known processes or apparatus. These two factors, namely the high number of orifices per surface unit and the improvement of the fiberization stability make it possible to produce strands made up of a large number of individual filaments and the reduction in the number of interruptions or restarts during the fiberization operation. The result is a significant increase in the quantity of strand produced per bushing, per day.

In order to improve the fiberization stability in the processes using a tipless plate having a high orifice density, it is necessary on the one hand to maintain the temperatures as stable and uniform as possible on the group of orifices of the bushing base plate, and on the hand to rapidly cool the glass at the exit of each orifice—that is to say at the level of the cones which form filaments, so as to maintain the separation of these cones and prevent the even partial flooding of the bushing base.

In addition to maintaining stable and uniform temperature and providing for rapid cooling of the glass at the exit of each orifice, in accordance with another aspect of the invention, a number of other related structural and operational features are provided as set out below.

Thus, the invention contemplates use of a bushing of elongated plan form having a bottom wall with downwardly presented wall portions at higher and lower levels, the lower wall portions of the bushing having orifices for delivery of the streams of glass for forming the filaments. Such orifices are desirably provided in at least two spaced parallel rows extended transversely of the bushing, and the bushing is provided with downwardly open transverse channels between the lower portions of the bottom wall having said spaced rows of orifices. Cooling means in the form of thermally conductive solid state cooling fins are mounted lengthwise of the downwardly open channels and the fins are cooled by thermal conduction through the material of the fins to at least one end thereof where the fins are connected to manifold means for a cooling medium. The downwardly open channels between the rows of glass feed orifices are also open ended to provide for intake of air, and the downwardly open channels and the cooling fins are proportional and relatively positioned to provide for free flow of air from the downwardly open channels laterally to the regions immediately below the lower portions of the bottom wall of the bushing. In addition, the downwardly presented surface of the lower wall portions of the bushing are planar throughout the regions immediately surrounding the glass streams issuing from the orifices to thereby provide for undisturbed flow of air from the regions of the downwardly open channels substantially directly to the streams of glass issuing from the orifices of all of the rows of orifices and thence into the flow of air entrained by the filaments drawn from the streams of glass.

In the embodiment shown in the drawings, the portions of the bushing at the higher and lower levels are established by providing a succession of upwardly open channels in the bottom wall of the bushing, the downwardly open channels as above referred to between the lower portions which have the orifices for glass delivery taking the form of spaces or grooves between the upwardly open channels. The bottom of each channel is provided with a large number of orifices from which the cones of glass and the filaments are drawn. The technique of the invention also involves effecting the drop in temperatures differentiated in the channels by thermal exchange with at least one cooling means equipped with elements placed on both sides of the upwardly open channels, and of regulating the cooling of these channels as a function of the temperature differences presented by the molten glass between the different orifices.

The differentiated and selective cooling of the upwardly open channels, or in other words the different temperature drops in the various channels, is carried out so as to reduce the temperature differences existing at the level of the orifices of the bushing, since these differences are always detrimental to fiberization stability. It achieves the best possible temperature uniformity and a more stable fiberization without directing an intense and continuous blowing of air or gas towards the bushing base.

This cooling results particularly from the thermal exchanges by effecting radiant heat transfer between the side-walls of the channels and the cooling means and is preferably controlled by adjusting the position of the cooling means and its various elements in relation to the channel bases. The different drops in temperature are regulated, in particular, by positioning the elements or a part of the elements of the cooling means in the grooves separating the consecutive channels and by placing them at varying heights with relation to the base of the grooves as a function of the temperatures at the level of the fiberization orifices.

According to one of the significant characteristics of the invention, the drop in temperature created between the entry level ($P_E$) of the molten material in a channel and the base or bottom of the channel, comparable to an average fiberization level ($P_F$), has in general a value at least equal to 20° C. For the fiberization of glass or of similar thermoplastic materials, the drops in temperature in the different channels will advantageously range from between 20° and 140° C. and preferably between 30° and 70° C.

According to another characteristic of the invention, the temperature of the glass in the orifices of a channel is practically equal to the temperature of the portion of plate immediately surrounding each orifice. This temperature is lower than the temperature of the plate at the base of each groove.

The cooling of the channels and glass cones by radiant heat transfer, controlled by regulating the position of the cooling means, is also a function of the dimensional characteristics of the bushings. The characteristics having significant influence on this thermal exchange are, in particular, the height of the channels and the thickness of their various walls as specified hereafter in the description of the apparatus.

The apparatus for feeding molten glass used for the implementation of the fiberization process according to the invention comprises a feeding source connected to a bushing of which the base is a plate preferably formed by a succession of upwardly and downwardly open channels, the latter being sometimes herein referred to as grooves, the base of each upwardly open channel being perforated with orifices. It has besides, in combination with this plate, at least one cooling means equipped with elongated elements placed on both sides of the upwardly open channels, and further includes means for drawing the glass cones formed at the exit of the orifices. The shape of the successive and parallel channels, their dimensions, and their spacing are such that, taking into account the thermal exchange with the cooling means and with the ambient gases carried along by the filaments during attenuation, the drops in temperature of at least 20° C. are created between the level of entry ($P_E$) of the molten glass in an upwardly open channel and the base of the channel perforated with orifices—that is to say the average fiberization level. These relative dimensions are calculated for each bushing as a function of the desired drop in temperature in a channel, and which is advantageously comprised between 20° C. and 140° C.

The base of the upwardly open channels is a substantially flat surface and the orifices there are preferably perforated in rows parallel to the direction of the channels. Each channel base can have from 1 to 6 rows of orifices, however, the number of orifices per surface unit being a growing function of the number of orifice rows per channel, the increase of the number of relation to the known apparatus becomes more involved when each channel base has at least two rows of orifices. Preferably, the orifices of adjacent rows in a channel are staggered in relation to one another.

According to a preferred embodiment of the apparatus, the successive channels have vertical walls connecting the flat base of each channel to the base of the grooves which define the entrance to the channels.

According to another characteristic of the invention, the height $h_1$ of each channel, measured between the level of fiberization ($P_F$) and the base of the groove at its junction with the sidewall, varies from 1 to 10 mm.

The cooling means associated with the bushing comprises a group of elongated elements cooled by conduction and convection. It preferably comprises thin standard-type fins soldered to at least one hollow tube cooled by a fluid. Cooling is also effected by the flow of air which is induced to flow over the surfaces of the channels by the gas entrained by the drawn filaments.

Among the various advantages contributed by the present invention, some of them, resulting from the increase in the total number of orifices per surface unit and by the fiberization position, in comparison with the bushings equipped with tips, have been mentioned above. In addition, the small difference in temperatures obtained at the level of the plate is such that the fiberization stability becomes at least as good as with tips, which enables or facilitates a high yield of filaments with very small diameters. This small difference in temperatures at the level of the orifices presents, besides, the advantage of decreasing the dispersion of filament diameters and consequently producing a better grade strand.

The presence of relatively wide and deep grooves between the consecutive channels offers greater possibilities for the positioning of the cooling fins with regard to the orifices than in the case of bushings with tips. The possibilities for regulating temperatures at the level of the orifices are consequently increased.

Another advantage of the invention is to enable the use of bushings having a relatively high channel height without being limited by the problems of pressure drops, which generally appear in bushings with tips when the height of these tips exceeds the average value currently employed.

The choice of deep channels enables better compensation of the temperature differentials existing horizontally upstream of the orifices, which facilitates the manufacture of very fine filaments.

It can be noted that the present invention enables the manufacture of fibers at a fiberization temperature which, at the level of the orifices, is lower than with the standard processes utilizing bushings having tips for the fiberization of identical glass compositions. Consequently, an increase in the life of the bushings is possible.

A preferred implementation of the fiberization apparatus in accordance with the invention and several realized examples are described hereafter with a detailed reference to FIGS. 1-9.

DETAILED DESCRIPTION OF THE INVENTION

Figure 1:
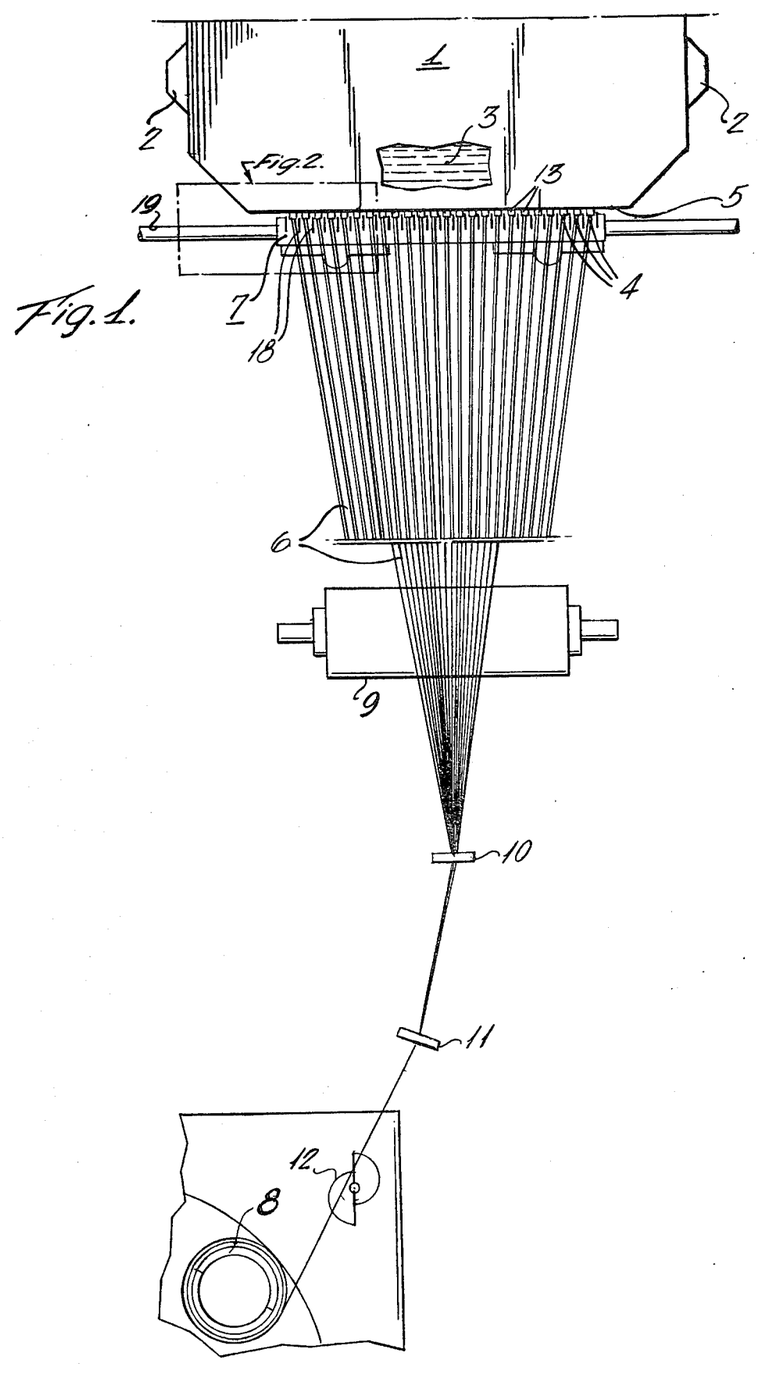
FIG. 1 is an overall schematic frontal elevation of an apparatus used for the mechanical attenuation of continuous fibers by high speed winding onto a rotary spindle and containing a bushing with channeled base plate according to the invention.

Reference is first made to FIG. 1, which represents by way of example, a general embodiment of a fiberization apparatus incorporating principles of the invention. Bushing 1, equipped with terminals 2 for the supply of electrical current used for its heating by the Joule effect, contains molten glass 3 which flows through orifices 4 of a perforated plate 5 constituting the bushing base. The bushing is in contact with a glass supply source of the known type, whether it be the forehearth of a direct melting oven from which the glass flows directly in the bushing at the molten state, or a supply system carrying the glass in the form of marbles, the marbles then being remelted in the bushing. No matter what supply source is utilized, the flow of the molten glass through the orifices of the perforated plate 5 is essentially assured by the hydrostatic pressure of the molten mass located above the plate. The glass at the exit of the orifices 4 is cooled due to the presence of a cooling system 7 with fins and is drawn into thin filaments 6 with a rotary spindle or bobbin 8. After depositing sizing with the use of a sizing means 9, the filaments 6 are gathered into one or several strands by the means normally used in this technique, such as combs 10 and 11, the strand next being wound around the rotary spindle along which it travels under the influence of a distribution means or helicoidal traverse 12.

Figures 2, 3, 4, 5, 6:
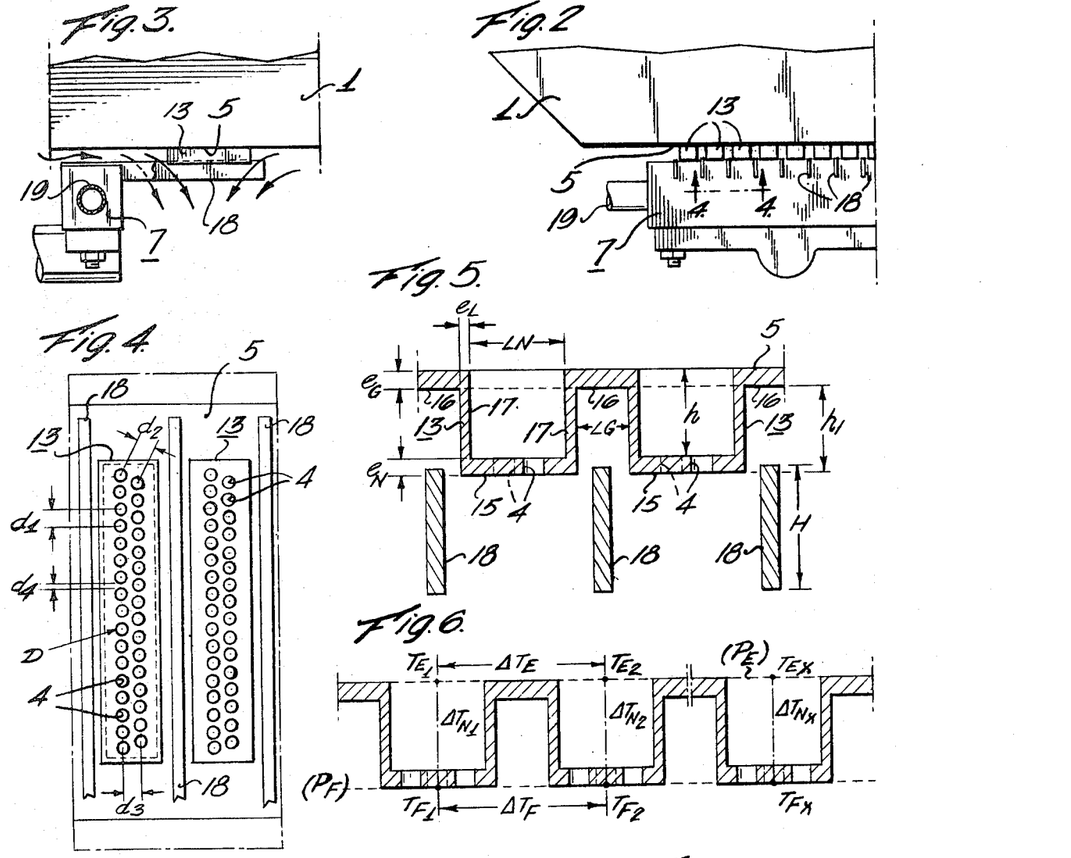
FIG. 2 is a partial view of a longitudinal section of the bushing base shown in FIG. 1.
FIG. 3 is a partial view of a transverse section of the apparatus shown in FIG. 1.
FIG. 4 is a partial plan view of the bushing on an enlarged scale as compared with FIG. 2, taken on line 4—4 of FIG. 2.
FIG. 5 is a sectional view of the bushing taken on line 5—5 of FIG. 4.
FIG. 6 is a sectional view of a bushing formed in accordance with the invention wherein each channel is provided with three rows of orifices.

The cooling system 7, best seen from FIGS. 2 and 3, is similar, for example, to those which are generally used for the cooling of bushing bases equipped with tips and have fins 18 connected to at least one main tube 19 in which a cooling liquid, such as water, circulates. These fins are preferably made of silver or nickled copper, but can also be made of other metals havng good thermal conductivity. They are placed opposite the grooves located on both sides of the channels, so as to possibly partially engage them in these grooves in order to favor the obtainment of the desired temperatures at the level of the fiberization orifices as specified hereafter in reference to the operation of the whole apparatus. The fins contribute to the cooling of the sidewalls of the channels by effecting radiant heat transfer; they reduce the mutual radiant heat transfer of the cones and streams of glass on each other by absorbing a part of the latter and they further act on the various thermal exchanges with the ambient air. In effect, the exchanges by convection are also to be taken into consideration, taking into account the entrainment of ambient gases by the filaments during attenuation. The presence of the grooves contributes to channeling the drawing in of air and assures a better stability of the cones.

FIGS. 4 and 5 show, on a larger scale, a part of the bushing base constituted by the perforated plate 5. This plate is made up of a succession of channels or canals 13 separated by grooves 14, the orifices 4, for the glass flow, being perforated in the base 15 of each channel. The base of the channels determine an average fiberization level ($P_F$) containing the orifices of the perforated plate. Each channel base, preferably almost flat, is connected to the bases 16 of the adjacent grooves by walls 17 which, in the preferred embodiment of the invention, are vertical. The channels shown in the drawings are placed in a transversal direction to the bushing, but a longitudinal placement can also be considered.

The orifices perforated at the base of the channels are preferably in a staggered pattern and form several rows parallel to the direction of the channels. The number of rows of orifices per channel generally varies from 1 to 6 and its choice results in a compromise between the number of orifices per surface unit of the plate and the operational stability of the fiberization. The risks of fiberization instability become the more significant the greater the number of rows of orifices per channel.

The starting of the bushings according to the invention takes place as follows: the glass flows through the orifices 4, wets the lower side 15 of the channels and progressively spreads out on the said side. The masses of glass thus formed flow downward due to the gravitational force and create one or more streams of glass per channel. The operator seizes the streams of glass and slowly proceeds with their drawing.

At this time, a gas current, such as air, is blown toward the bushing base by an apparatus not shown. The streams of glass, thus cooled, are then subdivided into as many filaments as there are orifices 4. As soon as the separation is achieved, the gas current is stopped and, simultaneously, the so-called fiberization operation begins.

The apparatus, in accordance with an object of the invention, operates in a very stable manner despite the absence of tips, due to the configuration of the channels connected to the cooling fins and to the exclusion of any system for intense continuous blowing of gas capable of perturbing the distribution of various drops in temperature obtained in the channels. The reduction of the temperature differentials existing at the level of the orifices of the bushing is obtained with reference to FIG. 6 in the following manner: at the level ($P_E$), schematically shown in FIG. 6 and defined as the average entry level of the glass in the channels, the temperatures of the glass at the entrance to two channels 1 and 2, are designated by $T_{E1}$, $T_{E2}$ respectively and by $T_{F1}$, $T_{F2}$ at the base of these channels, at the level of the orifices, that is to say at the average fiberization level ($P_F$). If $T_{E2}$ is greater than $T_{E1}$, all other parameters being constant, the drop in temperature, $\Delta T_{N2} = T_{E2} - T_{F2}$, in the channel 2 is greater than the drop in temperature, $\Delta T_{N1} = T_{E1} - T_{F1}$, in the channel 1 given the preponderance of thermal exchanges by radiant heat transfer in this system without additional gas when the operating temperatures are very high. Consequently, the temperature differential at the average fiberization level, $\Delta T_F = T_{F2} - T_{F1}$, will be lower than the differential $\Delta T_E = T_{E2} - T_{E1}$ at the entry level of the channels. The greater the temperature drop in each channel, the greater is the effect of thermal damping, that is to say the minimization of the temperature differences at the fiberizing level.

The positioning of the cooling fins and the ambient gas which is drawn into the grooves controls the drops in temperature $\Delta T_N$ in the channels as a function of the differences in the average fiberization level as stated in the examples. The electrical power dissipated for the heating of the bushing and the residence time of the glass in the channels, which is a function of the glass output through the orifices for a given bushing, are also parameters having influence on the drops in temperature $\Delta T_N$ at the vertical level.

The drops in temperature in the channels also depend on their dimensions, their shape, the thickness of the walls as well as the dimensions of the grooves. The dimensional characteristics of each bushing are therefore used to produce the drops in temperature which are desirable in the channels to obtain an acceptable compromise between a very stable fiberization, a large number of orifices per surface unit, a good distribution of the diameters of the filaments making up the strand, and a good manufacturing yield including the case of fiberization of small diameter filaments.

The height $h_1$ of the channel, defined in FIG. 5, has considerable influence on the temperature drop $\Delta T_N = T_E - T_F$ in this channel and can vary between 1 and 10 mm. For a height less than 1 mm, the effect of thermal damping is insignificant, and the temperature differentials between the orifices of different channels thus remain large enough to result in fiberization instability, an increase in the number of filament ruptures, and consequently a low manufacturing yield. Besides, the discontinuity of surface between two successive channels becomes insufficient for avoiding flooding from one channel to another.

Conversely, when the height of the channels exceeds 10 mm, the drop in temperature is such that in order to obtain an appropriate temperature $T_F$, it is necessary to excessively heat the glass contained in the bushing.

The height of the channels is such that the drops in temperature $\Delta T_N$ are at least equal to 20° C., advantageously comprised between 20° and 140° C., and preferably between 30° and 70° C. For the manufacture of small diameter filaments, on the order of 5 to 7 microns, the risks of filament rupture are more significant and so it is desirable to have a particularly low temperature differential at the level of the fiberization surface. In this case it is advantageous to use a bushing having fairly deep channels.

FIGS. 4, 7, 8 and 9 illustrate four examples of possible orifice arrangements. The distance between axes $d_1$, $d_2$, $d_3$ and distance between orifices $d_4$ shown in FIGS. 4 and 7-9 are chosen as a function of the compromise between the density of orifices and the fiberization stability. An advantageous arrangement consists of staggering orifices according to equilateral triangles ($d_1 = d_2$). The distance, from edge to edge between two adjacent orifices can vary between 0.2 mm and 1 mm in the utilization of a channel base made of platinum containing 10% rhodium for the fiberization of a glass at a viscosity comprised between 1000 and 6000 poises. For values greater than 1 mm the loss of useful surface becomes prohibitive.

Concerning the width $L_G$ of a groove between two adjacent channels, on the one hand there is an advantage to choosing the smallest possible dimension, in order to increase the number of orifices per surface unit of the bushing base; on the other it must be sufficient for preventing the propagation of accidental flooding from one channel to the two adjacent channels. Any modification of this width results in a variation in the thermal exchangers by radiant heat transfer, particularly between the sidewalls of two adjacent channels and between each sidewall and the corresponding cooling fin.

In practice, it is preferable to provide a width which enables the engagement of the cooling fins between the channels, in order to increase the drops in temperature in the channels. The variations of this parameter are stated in a non-restrictive way in the examples described later on.

The varying areas of thickness $e_G$, $e_L$, $e_N$ respectively of the groove base, the sidewalls of the channel and the channel base given in FIG. 5 are essentially conditioned by the phenomena of electrical energy dissipated by the Joule effect, the mechanical resistance of the bushing, the phenomena of thermal exchanges, and the glass output for the thickness $e_N$ of the channel base.

The thickness $e_G$ of the base of the grooves can vary between 0.5 mm and 3 mm. It is not desirable to go below 0.5 mm, since the mechanical resistance of the bushing base becomes inadequate; on the other hand, for values greater than 3 mm, the quantity of immobilized metal is too significant to obtain attractive manufacturing costs and yield. The thickness $e_N$ of the channel base, which influences the glass output as well as the diameter of the orifices, also varies between 0.5 mm and 3 mm as a function of the orifice diameters, and is preferably around 1 mm. The sidewalls of the channels have a thickness $e_L$ preferably between 0.3 mm and 1.5 mm and preferably between 0.5 and 1 mm.

The relatively simple shape of the bushing base facilitates its manufacture considerably in comparison to bushings with tips.

The base may be formed either by simple stamping of a plate possibly followed by slight modification by machining when the thicknesses of different parts of the walls are not identical, or by machining the mass with a numerical controlled milling machine.

Some non-restrictive examples are given hereafter, illustrating a few particular embodiments of a bushing in accordance with the invention. In these examples, each bushing is associated with a known process, either to a marble supply apparatus, the marbles being then remelted in the heated bushing by the Joule effect, or to the forehearth of a melting oven which directly delivers the glass at the molten state. The glass used for supplying the bushings of Examples 1 to 9 is an E glass having a viscosity of about 1300 poises at 1200° C. With these bushings, which have about 150 to 600 orifices and a relatively high density of orifices, comprised between 7 and 20 orifices/cm², it was possible to precisely determine the influence of the various parameters, to demonstrate the thermal damping effect obtained by the drops in temperature in the different channels, and to show the influence of regulating the position of the different elements of the cooling means on this thermal damping.

These examples are supplemented by the embodiment of bushings in which the density of orifices varies in the same range, however containing up to 1600 orifices.

These bushings, described in Examples 10 and 11, are fed with a molten E glass and in which the viscosity has a value of about 1000 poises at 1200° C.

The temperature measurements of the glass are effected at the same time by thermocouples placed at the opening of the orifices and by optical pyrometry aimed at the inside of the orifices. The values given in the examples were calculated according to the method described in the American publication entitled "Effects of Gases on E Glass Fibers" OH, S.M. (Thesis from Iowa State University, 1975, order no. 76-1864). The temperatures of the metal plate in the zone adjacent to the orifices are also obtained by optical pyrometry with a correction due to the emissivity of the metal. The temperatures of the glass at the entrance to each channel are measured with thermocouples.

EXAMPLE 1

Figure 7:
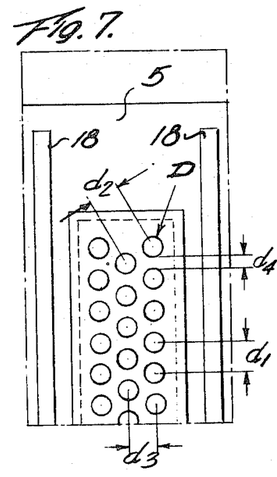
FIG. 7 is a partial plan view illustrating the underside of the bushing of FIG. 6.
Figure 8:
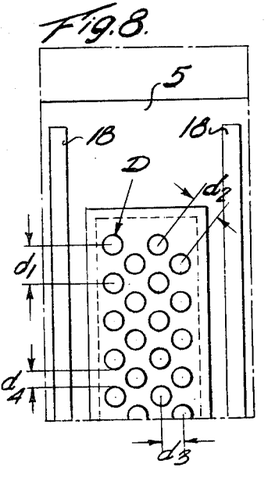
FIGS. 8 and 9 are partial plan views of the underside of bushings of the present invention illustrating channels having four and five rows of orifices.

The bushing base is made of a metal plate of 90% platinum-10% rhodium and contains 3 transversely extending channels separated by 2 grooves having vertical sidewalls. The base of the channels and grooves is flat, as shown in FIGS. 5 and 6, and each one of the channels is perforated with 50 orifices distributed in 3 rows according to the arrangement of FIG. 7. The values of the different dimensions schematically represented in FIGS. 5 and 7 are the following:

| | |
|---|---|
| dimensions of the bushing base | circular, 72 mm in diameter |
| height of the channels | $h_l$ = 6 mm |
| length of the channels | $l_N$ = 36.5 mm |
| width of the channels | $L_N$ = 6.5 mm |
| width of the grooves | $L_G$ = 4 mm |
| thickness of the sidewalls | $e_L$ = 0.5 mm |
| thickness of the groove base | $e_G$ = 1 mm |
| thickness of the channel base | $e_N$ = 1 mm |
| diameter of orifices | D = 1.5 mm |
| distances between orifices | $d_1$ = 2 mm |
| | $d_2$ = 2.24 mm |
| | $d_3$ = 2 mm |

The four cooling fins placed on both sides of the channels have a height H=8 mm. They are not engaged in the grooves but are placed so that their upper extremity is found at the height of the base of the channels.

The very satisfactory operation of the bushing enables the obtainment of filaments of 11 microns by operating at a pull rate of 15 m/s, corresponding to a production of 50 kg/day. The temperatures measured at the level of entry ($P_E$) to the channels are the following: $T_{E1}$=1215° C.; $T_{E2}$=1209° C.; $T_{E3}$=1205° C. The corresponding temperatures, measured at the level of fiberization ($P_F$) at the level of the orifice in front of the middle row, are equal to $T_{F1}$=1161° C.; $T_{F2}$=1162° C.; $T_{F3}$=1162° C.

The maximum temperature differential at the horizontal level ($P_E$), $\Delta T_E = T_{E3} - T_{E1}$, reaches 10° C., however, it can be stated that the temperatures at the fiberization level are very uniform, the maximum temperature differential $\Delta T_F = T_{F3} - T_{F1}$ being only 1° C. These results show that the association in the bushing of deep channels and cooling fins enables "damping" or reduction of the inevitable temperature differentials, which invariably exist at the horizontal level situated upstream of the fiberization level orifices.

EXAMPLE 2

Figure 11:
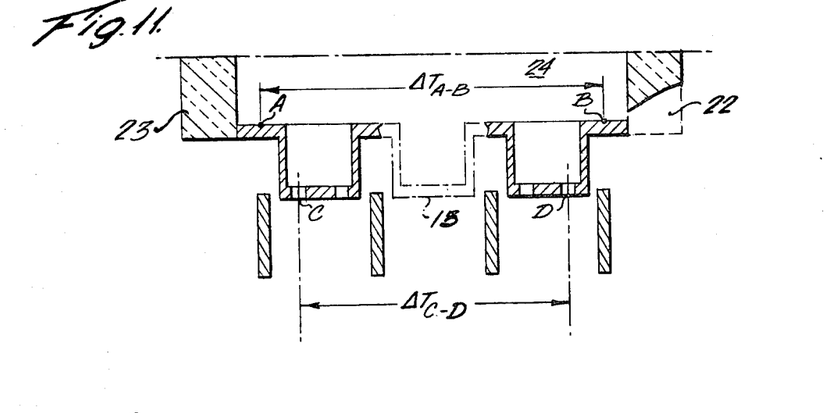
FIGS. 11 and 12 are schematic vertical sections of the base of bushings in which a part of the refractory block was eliminated, FIG. 11 representing a bushing with three channels and FIG. 12 a bushing with a flat base, of the known type, for reference.
Figure 12:
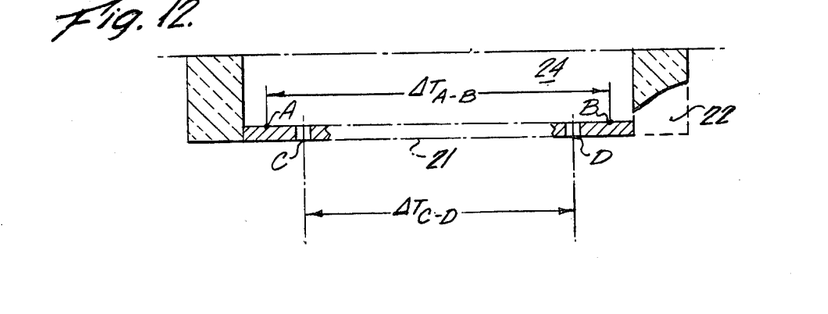

The "thermal damping" effect resulting from the varying drops in temperature in the channels is demonstrated in this example by comparing the maximum temperature differential at the fiberization level ($\Delta T_F$) of a bushing equipped with channels 13, (FIG. 11), with the maximum differential of a bushing without channels in which the base is consequently made of a completely flat, perforated plate 21 (FIG. 12).

In order to accentuate the temperature differentials at the horizontal level at the level of the base plate, for example between the two points A and B located at the extremities of the plate, a thermal imbalance is voluntarily created by removing a part 22 of the refractory block 23. As shown in FIGS. 11 and 12, the refractory block is partially eliminated on just one side of the bushings in order to increase asymmetry.

The bushing with a flat circular base, 72 mm in diameter, contains 150 orifices placed in 3 triple transverse rows. Cooling fins 10 mm high are placed 1.5 mm from the base on both sides of the bottom of each channel containing the triple rows of orifices. By operating at a pull rate of 10 m/s, filaments of 12 microns are manufactured with this bushing, and the temperatures at the two points A and B located near the extremities of the plate and 55 mm apart are measured by optical pyrometry. The temperature differential $\Delta T_{A-B}$ between these points is 16° C. The temperature differential between the two orifices C and D, 22 mm apart, $\Delta T_{C-D}$ also amounts to 16° C.

The bushing with channels of FIG. 11 is identical to that of Example 1 and the cooling fins are in the same position with regard to the base of the channels. The pull rate and the fiberization temperature at the level of the orifices are regulated to the same values as with the bushing with flat base for manufacturing filaments of equal diameter. The temperature differential between the two points A and B located near the extremities of the channeled plate, those also 55 mm apart, is 15° C. On the other hand, the temperature differential $\Delta T_{C-D}$ between the two orifices C and D, 22 mm apart and located at the base of the first and third channels, only reaches 8° C.

It is stated, therefore, that the thermal imbalance considerably reduced at the level of the orifices for the channeled bushing base subsists, on the contrary, for the flat base bushing.

The thermal imbalance is accentuated by removing a more significant part of the refractory block on each one of the two bushings. With the flat base bushing, for a temperature differential $\Delta T_{A-B}$ reaching about 30° C. the fiberization becomes unstable and non-uniform and a filament rupture followed by a flooding is produced fairly rapidly. For the bushing with channels, the differential $\Delta T_{A-B}$ of 30° C. is partially absorbed in the channels and, at the level of orifices C and D, a differential $\Delta T_{C-D}$=22° C. results; a value which enables obtainment of a still stable fiberization.

This "thermal damping" can be improved considerably by engaging the set of cooling fins in the grooves in order to cause more significant drops in temperature $\Delta T_N$ in the channels. Each one of the fins is thus raised 5 mm in relation to the base of the channels and in this new position $\Delta T_{A-B}$=28° C. and $\Delta T_{C-D}$=15° C. is obtained at the level of the orifices, which improves the stability of the fiberization in relation to the preceding results.

These comparative examples demonstrate the improvements obtained with the channeled base bushing concerning the uniformity of temperatures at the level of the fiberization orifices.

EXAMPLE 3

A bushing is used in which the plate contains 150 orifices distributed at the base of three transversal channels as in Example 1, however these channels have a height $h_1$ of 3 mm instead of 6 mm. All other dimensions are identical to those given in Example 1, the position of the cooling fins being unchanged with regard to the base of the channels.

The drop in temperature in the middle channel, $\Delta T_{N2}$, has a value of 24° C., and the temperatures measured at the fiberization level $P_F$ at the level of an orifice of a middle row of channels $N_1$, $N_2$, $N_3$, are $T_{F1}=1169°$ C., $T_{F2}=1171°$ C., $T_{F3}=1172°$ C. respectively. Under these conditions, the operation of the bushing was very satisfactory and enabled the obtainment of filaments of 10 microns by adopting a pull rate of 15 m/s, which corresponds to a daily production of 45 kg.

EXAMPLE 4

The three channels of this new bushing have a height h1 of 10 mm. All other dimensions have the same value as in Examples 1 and 3 and the distribution of the 150 orifices is identical as well. The upper part of the cooling fins 10 mm high, is found at the level of the base of the channels. With a fiberization speed of 12 m/s, a glass output of 45 kg/day and a temperature $T_{F2}=1170°$ C. in an orifice of the middle row of the channel $N_2$, filaments are obtained having an average diameter of 11.5 microns. The drop in temperature $\Delta T_{N2}$ in the middle channel $N_2$ is 89° C., and a micrographic analysis of the strand obtained shows that the distribution of the diameters of the 150 filaments is uniform, 90% of the filaments having a diameter comprised between 11 and 12 microns.

When the 4 cooling fins are raised 7 mm at the inside of the grooves, the electrical power supplied to the bushing being modified so that $T_{F2}$ remains equal to 1170° C., the drop in temperature $\Delta T_{N2}$ in the middle channel reached 134° C. There, again, the operation of the bushing was judged to be very satisfactory.

EXAMPLE 5

In relation to the bushing in Example 3, only the thickness of the sidewalls of the channels were modified. For a thickness $e_L=1$ mm, all other dimensions being identical, the drop in temperature $\Delta T_{N2}$ in the middle channel $N_2$ is 20° C. with a fiberization speed of 15 m/s. The temperatures at the fiberization level ($P_F$) are $T_{F1}=1169°$ C., $T_{F2}=1161°$ C. and $T_{F3}=1162°$ C. respectively.

The operation of the bushing, not as good as the one observed in the preceding examples, enabled the obtainment of filaments of 10 microns and a production of 44 kg/day.

By engaging the 4 cooling fins 2 mm into the grooves, the drop in temperature $\Delta T_{N2}$ in the middle channel reaches 30° C. and the temperatures in the fiberization level are thus $T_{F1}=1167°$ C., $T_{F2}=1164°$ C., $T_{F3}=1166°$ C., respectively. The operation of the bushing is again very satisfactory.

EXAMPLE 6

Figure 9:
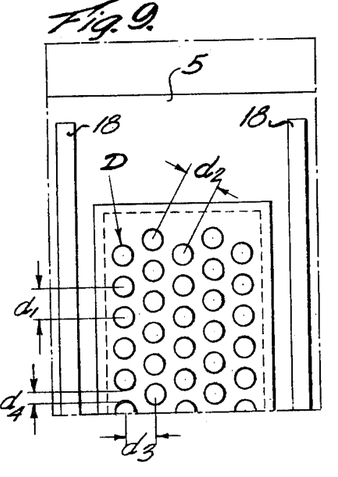
Figure 10:
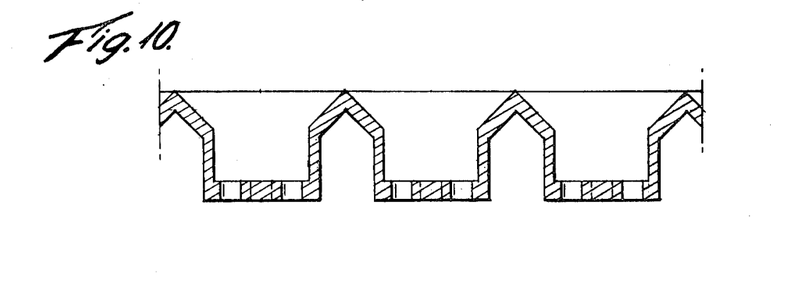
FIG. 10 is a partial sectional view of a bushing formed according to the invention wherein the base of the grooves separating channels is V-shaped.

In this example, several modifications were made with regard to the bushing in Example 3. One hundred and fifty-six orifices are perforated at the base of 3 channels and arranged in 5 rows per channel, as shown in FIG. 9. This arrangement modifies the length and the width of each channel, which are respectively equal to: $l_N=24.5$ mm and $L_N=10.5$ mm.

All other dimensions are identical to those specified in Example 3.

The average temperature measured at the level of the orifices of the middle channel is on the order of 1153° C., and the corresponding drop in temperature is on the order of 44° C. The temperature differentials measured between the different orifices does not exceed 8° to 10° C.

Under these conditions, by drawing the glass at 15 m/s, filaments having an average diameter of 10 microns are obtained.

The operation of the bushing is very satisfactory and assures a daily production of 42 kg of strand.

EXAMPLE 7

As compared to the bushing of Example 1, the only modification made concerns the height $h_1$ of the channel, which is changed from 6 mm to 1.5 mm. No changes were made to the other dimensions.

The temperatures at the fiberization level are the following: $T_{F1}=1165°$ C.; $T_{F2}=1160°$ C.; $T_{F3}=1165°$ C.

The drop in temperature in the middle channel is on the order of 20° C.

By adopting a pull rate of 15 m/sec., filaments having a diameter of 10 microns are obtained.

The operation of the bushing is fairly good and enables the obtainment of a production of 43 kg per day.

EXAMPLE 8

The dimensional characteristics of the bushing, having 370 orifices, used in this example are listed in Table I and the arrangement of the orifices at the base of the channels corresponds to the one shown in FIG. 4. The cooling system, known per se, contains 12 fins distributed on 2 cooling means. Filaments having an average diameter of 7 microns are obtained by operating at a pull rate of 26 m/s. The operation of the bushing is good and enables the obtainment of a production of 80 kg per day.

TABLE I

| Examples | | 8 | 9 | 10 | 11 |
|---|---|---|---|---|---|
| Total number of orifices | | 370 | 612 | 1608 | 1600 |
| Number of channels | | 10 | 36 | 24 | 32 |
| Number of rows of orifices/channel | | 2 | 1 | 3 | 2 |
| Dimensions of the bushing base L × l (mm) | | 81 × 42 | 256 × 42 | 260 × 58 | 266 × 70 |
| Height of channels: $h_l$ (mm) | | 6 | 4.5 | 3 | 6 |
| Dimensions of the channel base in mm | $L_N$ | 4.5 | 2 | 7 | 4.7 |
| | $l_N$ | 42 | 42 | 58 | 65 |
| Width $L_G$ of a groove | | 3.5 | 4 | 6 | 3.7 |
| Thickness of the walls in mm | $e_L$ | 0.5 | 0.5 | 0.5 | 0.5 |
| | $e_G$ | 1 | 1 | 1 | 1 |
| | $e_N$ | 1 | 1 | 1 | 1 |
| Diameter of the orifices in mm | | 1.30 | 1.70 | 1.70 | 1.70 |
| Distance between orifices in mm | $d_1$ | 2 | 2.4 | 2.30 | 2.30 |
| | $d_2$ | 2.24 | — | 2.31 | 2.31 |
| | $d_3$ | 2 | — | 2 | 2 |
| Height of the fins (mm) | | 10 | 10 | 14 | 14 |

EXAMPLE 9

The influence of the position of the cooling fins on the amplitude of thermal damping, due to the presence of the channels, is enumerated in this example with a bushing having 612 orifices. The various dimensions which characterize it and the distribution of orifices at the base of the channels appear in Table I. The cooling system, consisting of two cooling means independent of each other, contains a total of 39 fins. By operating at a fiberization speed of 47 m/s, filaments are made having an average diameter of 9.5 microns corresponding to a production of 440 kg/day.

In a first testing, the upper edge of the fins of the left cooling means is at the same level as the base of the channels, and the upper edge of the fins of the right cooling means is 1 mm below this level. In this configuration, the temperature of the glass at the exit of the first orifice of each channel is measured by optical pyrometry during the fiberization operation. The temperature profile obtained along the bushing shows that the differential $\Delta T_F$ between the minimum and maximum temperatures at the fiberization level reaches 50° C., this high value resulting from a voluntarily sought thermal imbalance.

In a second testing, the upper edge of the fins of the two cooling means is established at the level of the base of the channels. The pull rate is maintained constant, the total glass output remains unchanged, and the distribution of temperatures of the glass along the bushing at the exit of each transversal channel shows that the maximum temperature differential is no more than 35° C. This noticeable reduction of $\Delta T_F$ is translated by a clear improvement of the thermal balance along the entire length of the bushing, including the left part where the position of the left cooling means was not modified.

EXAMPLE 10

Beginning with a bushing having 1608 orifices placed at the base of the channels, of which the characteristics are given in Table I, filaments of 14 microns are manufactured by operating at a speed of 17 m/s by achieving a production of 900 kg/day. In addition it should be noted that the upper edge of the group of cooling fins is noticeably at the same height as the base of the channels.

The temperatures of the glass at the level of the first orifice of the middle row of each channel are measured by optical pyrometry and, in this way, the difference between the minimum and maximum temperatures at the fiberization level $P_F$ is determined: this differential $\Delta T_F$ has a value of 31° C., the maximum and minimum temperatures being 1157° C. and 1126° C.

The comparison between the bushing in accordance with the invention and a traditional bushing with tips shows that the bushing with channels associated with the cooling fins enables the obtainment of temperature uniformity and fiberization stability comparable to those of traditional bushings although the bushing of this invention has a clearly higher number of orifices per surface unit. Furthermore, the weight of immobilized precious metal for the bushing with channels is about 45% the weight of metal used for the corresponding bushing with tips.

EXAMPLE 11

The bushing contains 1600 orifices distributed at the base of channels which are more narrow and taller than in the preceding example, as can be seen in Table I. Furthermore, each transverse channel is made up of two portions of 32.6 mm separated by a space of 5 mm. The upper edge of the cooling fins is at the same height as the base of the channels. The maximum temperature differential $\Delta T_F$ at the fiberization level is 35° C.

By operating at a pull rate of 8.3 m/s, filaments having an average diameter of 19 microns are obtained.

This bushing has a very satisfactory operation for a production of 865 kg/day.

We claim:

1. The apparatus for drawing attenuable material in attenuable condition, such as molten glass, into filaments comprising a glass supply source, a bushing connected thereto, said bushing having a base which is made of a succession of channels and grooves exposed to the ambient, the base of each channel being perforated with orifices; and means for drawing the attenuable material issuing from the orifices, characterized in that the dimensions of the channels and grooves are such that by thermal exchange with at least one cooling means equipped with elements placed opposite the grooves, drops in temperature of at least 20° C. are created between the level of entry $P_E$ of the molten glass in each channel and the base of the latter, or the fiberization level $P_F$.

2. The apparatus in accordance with claim 1, characterized in that the successive channels are parallel.

3. The apparatus in accordance with claim 2, characterized in that the base of each channel is relatively flat and has at least two rows of orifices placed parallel to the direction of the channels.

4. The apparatus in accordance with claim 3, characterized in that the channels are transversely arranged with respect to the ends of the bushing.

5. The apparatus in accordance with claim 4, characterized in that the sidewalls of the successive channels are vertical.

6. The apparatus in accordance with claim 5, characterized in that the height of the channels $h_1$ is comprised between 1 and 10 mm.

7. The apparatus in accordance with claim 6, characterized in that each cooling means comprises a succession of thin fins cooled by conduction.

8. The apparatus in accordance with claim 7, characterized in that the distance between two adjacent channels is such that a cooling fin can be engaged in the groove separating these two channels.

9. The apparatus in accordance with claim 8, characterized in that the thickness of the base of the channels is comprised between 0.5 mm and 3 mm.

10. The apparatus in accordance with claim 9, characterized in that the thickness of the sidewalls of the channels is comprised between 0.3 and 1.5 mm.

11. The apparatus in accordance with claim 10, characterized in that the minimum distance from edge to edge between two adjacent orifices is comprised between 0.2 and 1 mm.

12. The apparatus in accordance with claim 11, characterized in that the number of orifices per surface unit of the bushing is comprised between 7 to 20 orifices per $cm^2$.

13. Apparatus for drawing attenuable material in attenuable condition, such as molten glass, into filaments, comprising a bushing of elongated plan form having a bottom wall with downwardly presented wall portions at higher and lower levels, the lower wall portions of the bushing having orifices for delivery of streams of glass for forming strands and including such orifices in at least two spaced parallel rows extended transversely of the bushing, mechanism spaced below the bushing for drawing filaments from the streams of molten glass with resultant entrainment of air by the filaments and for collecting the filaments to form a strand, the bushing having downwardly open transverse channels exposed to the ambient between the bottom wall portions having said spaced rows of orifices, and means for cooling the glass streams by radiant heat absorption comprising thermally conductive solid state cooling fins mounted lengthwise of said channels, means for cooling the fins by thermal conduction through the material of the fins lengthwise thereof to at least one end of each fin, said cooling means further including thermally conductive manifold means for a cooling medium, one end of each fin being connected to the manifold means to provide the thermal conduction of heat from the fins to the manifold means, the channels between the rows of glass feed orifices being open ended to provide for intake of air and the channels and the cooling fins being proportioned and relatively positioned to provide free flow of air from said channels laterally to the regions immediately below the lower portions of the bottom wall of the bushing, and the downwardly presented surface of the lower wall portions of the bushing being planar throughout the regions immediately surrounding the glass streams issuing from the orifices to thereby provide for undisturbed flow of air from the regions of said channels substantially directly to the streams of glass issuing from the orifices of all of the rows of orifices and thence into the flow of air entrained by the filaments drawn from the streams of glass.

* * * * *